United States Patent Office 3,733,249
Patented May 15, 1973

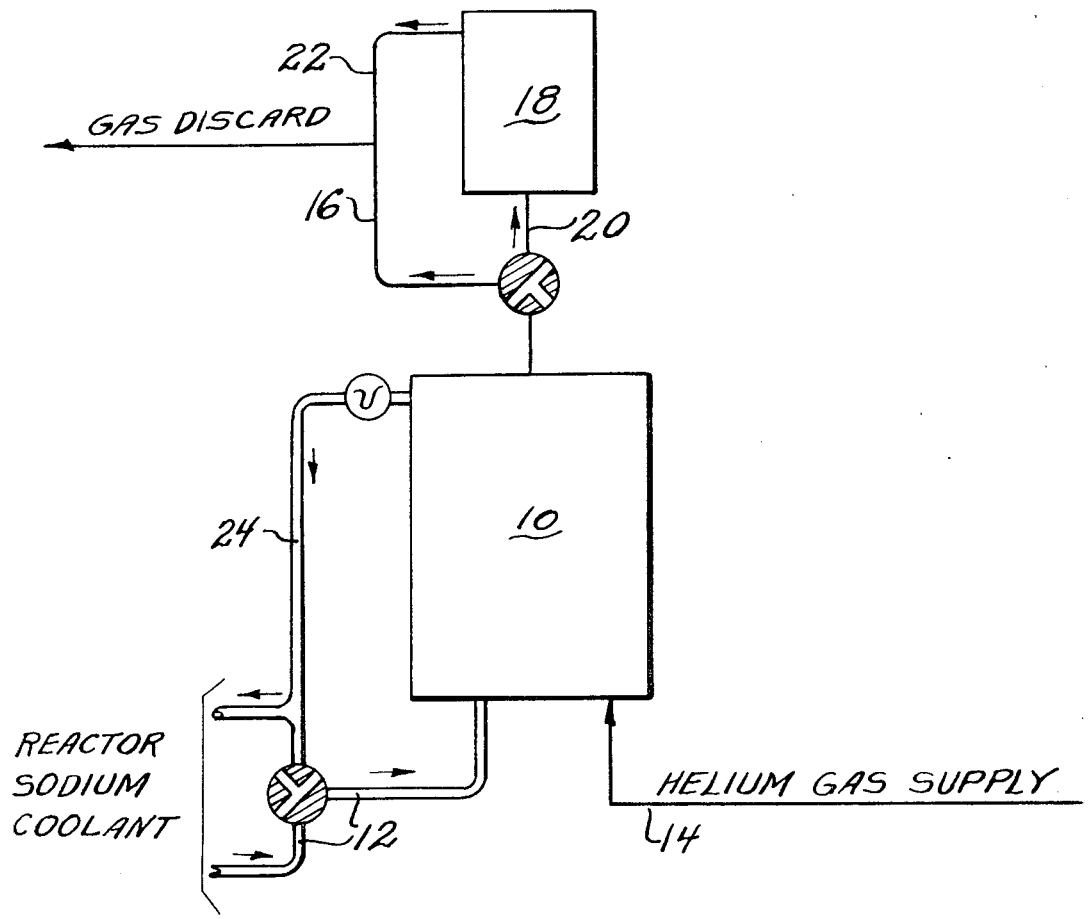

3,733,249
METHOD FOR DETECTING AND MONITORING A FUEL ELEMENT FAILURE IN A NUCLEAR REACTOR
William E. Miller, Naperville, and William J. Mecham, Hickory Hills, Ill., assignors to the United States of America as represented by the United States Atomic Energy Commission
Filed Nov. 2, 1971, Ser. No. 194,963
Int. Cl. G21c *17/04*
U.S. Cl. 176—19 LD         6 Claims

ABSTRACT OF THE DISCLOSURE

A method for detecting a fuel element failure in a liquid-sodium-cooled fast breeder reactor and for monitoring the progression thereof, wherein the failure causes sodium coolant to contact the fuel oxide, which comprises determining the level of $^{135}$I activity in the liquid sodium resulting from the failed fuel element by separating and counting its daughter $^{135m}$Xe utilizing an inert gas sparge.

CONTRACTUAL ORIGIN OF THE INVENTION

The invention described herein was made in the course of, or under, a contract with the United States Atomic Energy Commission.

BACKGROUND OF THE INVENTION

Failures in the cladding of nuclear fuel elements in nuclear reactors present very serious problems and can result in extensive and costly damage to the reactor as well as long periods of reactor shut-down. It is important, then, that such failures be detected easily and quickly so as to prevent serious damage.

In liquid-sodium-cooled nuclear reactors, fuel element cladding failures are accompanied by the release of fission products to the liquid sodium coolant. These fission products are present in the form of gases and elemental or combined solids. The form and types of fission products with are released depend upon the type of fuel element failure. A cladding failure in the gas-containing plenum section of a fuel element may result only in the release of gaseous fission products such as xenon and krypton. Fission gas releases due to such plenum failures or "leakers" are not serious and do not result in damage to the reactor. However, a cladding failure wherein the sodium coolant enters the fuel element and contacts the fuel oxide therein is serious and can result in extensive damage if not detected quickly, its progression monitored and the defective fuel element removed when it becomes necessary. In such failures, the sodium and fuel oxide interact to cause swelling and weakening of the oxide structure, resulting in solid fission products being leached from the fuel by the sodium and released along with fission gases to the sodium coolant system. This type of failure can be tolerated to a certain extent. However, the failure's progression must be carefully monitored, for if it continues or increases in severity, the continued leaching can cause the disintegration of the fuel matrix and fuel particle washout through the failure. It is the presence of fuel particles in the sodium coolant which can cause severe damage and therefore must be avoided. Fuel particles in the cooling system can clog fuel channels thereby increasing the temperature of the system, which can lead to further fuel element failures, creating a fuel element failure propagation. In addition, the highly radioactive fuel particles contaminate the entire coolant system and can become lodged in parts of the system, such as in pumps and heaters, which are normally not maintained entirely by remote means. This would create a dangerous safety problem as well as a maintenance problem, since these lodged particles with long half-lives would not drain out with the sodium as do soluble fission products. Clearly, then, a failure wherein sodium contacts the fuel oxide needs to be detected early and the failure's progression monitored carfully for indications of fuel washout imminency. When fuel washout becomes imminent, the reactor must be shut down and the failed fuel element removed.

Various techniques and procedures have been proposed and utilized in the past to detect fuel element failures. Techniques for monitoring the sodium coolant or sodium cover gas to determine the total decay activity of fission products present therein have been successful in detecting fuel element failures. However, these techniques have not proven entirely satisfactory due to their inability to differentiate between the decay activity of gaseous fission products resulting from "leakers" and the decay activity of dissolved solid fission products leached from the nuclear fuel during sodium-fuel oxide contact in the more serious fuel element failures. As a result, such monitoring techniques have necessitated numerous reactor shut-downs in the past merely from fission gas leaks in the fuel element plenum sections. Such shut-downs due to "leakers" are unnecessary, costly and result in a significant loss of reactor availability.

Delayed-neutron monitoring, wherein very short-lived halogen fission product isotopes such as $^{137}$I (23 sec.) and $^{87}$Br (55 sec.) are monitored by detecting the neutrons emitted during their decay, is another method which has been utilized to detect fuel element failures. This technique, however, has a very low sensitivity due to the short half-life of neutron precursors, resulting in the detection of only the most serious of fuel element failures and then only after a significant concentration of fission products, as well as fuel particles in the case of a rapid failure progression, has accumulated in the sodium coolant.

Halogens are one class of fission products which are leached readily from oxide fuels by sodium. Normally, iodine isotopes would be gaseous at the temperature of the oxide fuel outer surface. However, in the oxide matrix, fission product iodine does not exist in the elemental form because of its chemical reactivity. This causes it to react to form compounds with other fission products such as cesium and to form complex compounds with the fuel matrix. This lowers the volatility of the iodine isotopes and their tendency to escape from the fuel element interior as gases. Therefore, iodine isotopes do not normally escape from failed fuel elements which are leaking only fission gases. There is ample evidence of this in reactors where numerous fission gas releases are detected from cover gas evidence for which no iodine increase in the coolant is detectable by coolant sampling and chemical analysis. The monitoring of halogen isotopes in the sodium coolant, then, would be desirable in order to monitor fuel element failures which are significant in terms of sodium-fuel oxide contact. Unfortunately, direct detection of halogen isotopes in the sodium coolant by gamma ray analysis is impossible.

A new method, however, has been developed whereby the $^{135}$I activity level in the sodium coolant is determined by measuring the activity of its daughter $^{135}$Xe, thereby enabling detection and monitoring of fuel element failures wherein sodium contacts the fuel oxide. Since $^{135}$I is not released by a fuel element failure which merely emits fission gases, such failures are not detected and therefore do not affect the detection and monitoring of failures which result in sodium-fuel oxide contact. By utilizing the present invention, a severe fuel element failure can be detected within minutes after initial sodium-fuel oxide contact and its progression continuously monitored. This invention enables reactor shut-down and fuel element removal if the failure becomes sufficiently serious so that fuel washout is imminent, yet it prevents unnecessary reactor shut-down due to "leakers."

Prior to this invention, so far as is known, rapid detection only of fuel element failures wherein sodium-fuel oxide contact occurs thereby requiring reactor shut-down and fuel element removal has not been accomplished.

It is, therefore, an object of this invention to provide a method for detecting fuel element failures in a nuclear reactor.

It is another object of this invention to provide a method for detecting in a liquid-sodium-cooled fast breeder reactor, fuel element failures wherein the sodium coolant contacts the fuel and leaches fission products therefrom.

A further object of this invention is to provide a method for detecting and monitoring the progression of severe fuel element failures in a liquid-sodium-cooled fast breeder reactor which is rapid, sensitive and unaffected by fission gas leakage from the fuel elements.

It is finally an object of the present invention to provide a method for determining the $^{135}I$ activity level in the sodium coolant of a liquid-sodium-cooled fast breeder reactor by measuring the decay activity of $^{135m}Xe$.

Further objects and advantages of the invention will be apparent from the following detailed description of the method.

SUMMARY OF THE INVENTION

A method of detecting a fuel element failure in a liquid-sodium-cooled fast breeder reactor and for monitoring the progression thereof, the failure causing sodium coolant to contact the fuel oxide, which comprises isolating a sample of the sodium coolant, sparging the sample with a gas inert to sodium for a period of time sufficient to remove any gaseous fission products dissolved therein and discarding the resultant gas therefrom, continuing the gas sparge for an additional measured period of time, collecting the resultant gas from the continued sparge, and assaying the collected resultant gas for $^{135m}Xe$ activity, the $^{135m}Xe$ having been formed during the additional measured time period from the decay of $^{135}I$ dissolved in the sodium sample as a result of the sodium-fuel oxide contact, whereby the $^{135m}Xe$ activity is indicative of the level of $^{135}I$ dissolved in the sodium coolant, the level of $^{135}I$ indicating the presence and severity or absence of a fuel element failure.

BRIEF DESCRIPTION OF THE DRAWING

The figure is a flow diagram illustrating the operation of the present invention.

DETAILED DESCRIPTION OF THE INVENTION

Referring first to the flow diagram of the figure, liquid sodium coolant is conveyed from the primary coolant system of a nuclear reactor (not shown) to a sparging vessel 10 by way of tubing 12. When the desired amount of sodium has accumulated in vessel 10, the sodium is isolated therein, and gas which is inert to sodium is introduced through the bottom of vessel 10 by line 14. The sodium sample within vessel 10 is then sparged by the gas for a period of time during which gaseous fission products dissolved in the sodium are stripped therefrom and along with the sparge gas conveyed out of vessel 10 through line 16 and discarded. The gaseous fission products having been stripped from the sodium sample, the gas sparge is continued for a measured period of time with the gas sparging the sodium sample and passing into collector 18 via line 20, the gas in collector 18 containing the gaseous fission products formed in the sodium sample during the measured time period and stripped therefrom by the gas sparge. The gas in collector 18 is then assayed for $^{135m}Xe$ activity, the $^{135m}Xe$ produced by the decay of $^{135}I$ present in the sodium sample. Conveniently, this can be done by removing the $^{135m}Xe$ from the collected gas by absorption on a chromatographic column (not shown) followed by gamma assay of the $^{135m}Xe$ utilizing a germanium-lithium spectrometer (not shown). After completion of the continued sparge, the gas in collector 18 is removed therefrom through line 22 and discarded while the sodium in vessel 10 may either be discarded or, as shown in the figure, returned to the reactor's coolant system through tubing 24.

$^{135}I$ decays to $^{135m}Xe$ and $^{135}Xe$ according to the following scheme,

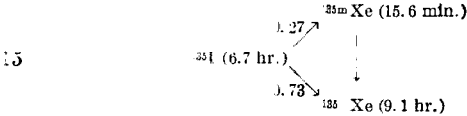

where 27% of $^{135}I$ decays to $^{135m}Xe$ and 73% to $^{135}Xe$. When a fuel element failure results in sodium-fuel oxide contact, $^{135}I$ along with numerous other solid and gaseous fission products including cesium, rubidium and bromine are leached from the fuel and dissolved by the sodium. In addition, activation products such as $^{23}Ne$ and $^{41}Ar$ which can interfere with gamma assay are also dissolved in the sodium coolant. These materials are all present in the isolated sodium sample. Upon initial sparging of the sample, all dissolved fission gases are stripped therefrom. Having so purged the sample, the only possible source of fission gas in the sample will be the decay of unstable solid isotopes dissolved therein, and the presence of $^{135}I$ in the sample will result in the formation, through decay, of gaseous $^{135m}Xe$ and $^{135}Xe$ isotopes.

$^{135}I$ is only one of a number of unstable solid isotopes dissolved in the sample. Several other such isotopes which have been utilized with previous fuel element failure detection methods are, along with their decay schemes,

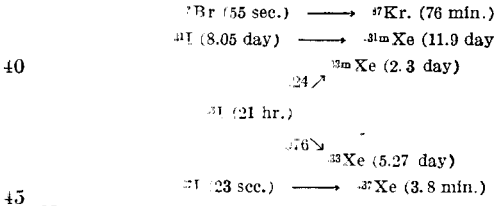

However, the half-lives of $^{131}I$ and $^{133}I$ and their daughter products are too long to produce a significant quantity of detectable decays in the relatively short time period of the continued sparge in the present method, while the half-lives of $^{87}Br$ and $^{137}I$ are so short that these isotopes will have decayed to $^{87}Kr$ and $^{137}Xe$ by the time the sodium sample is isolated, with the $^{87}Kr$ and $^{137}Xe$ isotopes being purged from the sample during the initial sparging period. $^{135}I$, however, has a half-life which is sufficiently long so that the isotopes has not significantly decayed prior to sodium sampling yet short enough to form a measurable quantity of daughter products during the short sparging-collecting period. In addition, the half-lives of the $^{135}I$ precursors, $^{135}Te$ (11 sec.) and $^{135}Sb$ (1.7 sec.), are short enough so that they will not complicate the $^{135}I$ determination. Further, isotopes with long half-lives would not suffice because the isotope background from previous failures would build up in the sodium coolant and decrease the sensitivity of the invention. Such is not the case with $^{135}I$.

Because $^{135m}Xe$'s half-life is so much shorter than that of $^{135m}Xe$, it is the decay of the $^{135m}Xe$ isotope that is utilized in the present invention for determing the $^{135}I$ level in the sodium even though 73% of $^{135}I$ decays to $^{135}Xe$ and only 27% to $^{135m}Xe$. A shorter half-life means a much greater decay activity during a short time period after isotope formation, and it is the decay activity of the collected daughter product which is measured. Therefore, although a greater quantity of $^{135}Xe$ will be formed by $^{135}I$ decay, the decay activity of $^{135m}Xe$ will be much greater during the short sparging-collection period than that of $^{135}$Xe, thereby allowing the $^{135}$I level determination to proceed very quickly when utilizing the activity of $^{135m}$Xe. $^{135}$Xe could be utilized for this determination, but a considerably longer sparging-collection-counting period would be required, and one of the more important advantages of the present invention is the rapidity with which the $^{135}$I level and presence of a fuel element failure can be determined.

It is necessary that the initial sparging period, wherein the resultant gas is discarded, be of sufficient duration so as to strip all the dissolved fission gases and activation products from the sodium sample. This is because it would be virtually impossible to determine specifically the decay activity of $^{135m}$Xe in the presence of these other isotopes, and even if such activity could be measured, the time period during which the $^{135m}$Xe was formed would not be known. Knowledge of this time period is essential in order to accurately determined the $^{135}$I level. In addition, there would be no way of determining whether the $^{135m}$Xe formation is due to sodium-fuel oxide contact or merely fission gas leaks. It has been found, however, that a 1 minute gas sparge at about 1-2 liters/min. is sufficient to strip virtually all dissolved fission gases from a 500 gram sodium sample. Therefore, an initial sparging-discarding period of 1 to 2 minutes would be sufficient to insure complete removal of the dissolved fission gases.

The continuing sparge-collection period can be of any maximum duration, but it must be at least sufficiently long to obtain an accurate decay count of any $^{135m}$Xe formed in the sample so as to accurately determine the $^{135}$I level. It has been found that a continuing sparge of 2 to 3 minutes will result in sufficient $^{135m}$Xe formation and decay to enable a determination of the background level of $^{135}$I in the sodium. Therefore, a 2 to 3 minute sparge-collection-count period would be more than adequate if the $^{135}$I level in the sodium increases due to the leaching of fuel oxide in a serious failure. This would make the total sparging and assaying time 3 to 5 minutes.

To determine the $^{135}$I level from the $^{135m}$Xe activity measurement, a known method for determining an isotope's activity level from the decay activity of its daughter is utilized. Applying the known decay rate relationship to the present case and rearranging it for the decay scheme,

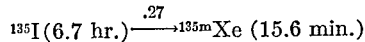
$$^{135}\text{I}(6.7 \text{ hr.}) \xrightarrow{.27} {}^{135m}\text{Xe} (15.6 \text{ min.})$$

the $^{135m}$Xe activity being measured by gamma assay, the following relationship is obtained:

(1) $$\lambda_A A_o = \frac{\text{Recorded count for } ^{135m}\text{Xe}}{.01 \times .8 \times \frac{.27 \lambda_B}{\lambda_B \times \lambda_A} \times \int_0^t (e^{-\lambda_A t} - e^{-\lambda_B t})dt}$$

where $A_o$ is the number of $^{135}$I atoms present at the time of sample isolation,
$\lambda_A$ is the decay constant for $^{135}$I,
$\lambda_B$ is the decay constant for $^{134m}$Xe,
$t$ is the time of the continued sparging-collection period, and
$\lambda_A A_o$ is the decay rate for $^{135}$I in the sample.

The .01 and .8 terms are particular to the specific counting system utilized for the present experimental work, the combined efficiency-geometry factor for 0.527 Mev. gamma for counting arrangement utilized being 0.01 with 80% of the decays of $^{135m}$Xe giving a gamma ray of 0.527 Mev. Therefore, these terms would very depending upon the particular counting system utilized. The relationship expressed by Equation 1 can be easily calculated by machine or computer so that the decay rate of $^{135}$I can be obtained almost immediately after the counting of the $^{135m}$Xe decays, the decay rate of $^{135}$I being an expression of the activity level of $^{135}$I.

To determine the presence of a serious fuel element failure from monitoring the level of $^{135}$I in the sodium as determined by the $^{135m}$Xe activity measurement, the $^{135}$I level must be compared with the normal $^{135}$I background level. Normally, there is a very small amounts of fission products generated in the reactor coolant itself, thereby creating such a background level. This is thought to be caused by minute fuel impurities on the outside of the fuel element cladding which fissions when the reactor is operating, releasing fission products to the coolant. If fuel failures are to be detected by $^{135}$I monitoring, then the fuel element failure must put significantly more of the $^{135}$I isotope into the coolant than the background level, or the failure will not be detectable. The item of importance, then, in detecting or monitoring $^{135}$I in the coolant is the signal-to-background ratio. The signal is defined as the increase above background caused by the failure. An increase in the signal as indicated by the $^{135m}$Xe decay activity from the sodium sample indicates a serious fuel element failure. The greater the increase becomes, the more severe the progression of sodium-fuel oxide contact and fission product laching. Therefore, the background level of $^{135}$I must initially be determined with subsequent $^{135}$I determinations being compared therewith.

The particular gas utilized in the present invention for sparging the sodium sample is not important so long as the is chemically inert to the sodium. Gas which reacts with the sodium would interfere with the stripping process as well as add potentially harmful impurities to the reactor coolant when the sodium sample is returned to the reactor's coolant system. Both helium and argon have been found to work quite well in the present invention, although the invention is not limited thereto.

The flow rate of the sparging gas has been found to have some effect on the time required to strip the fission gases from the sodium sample, 1-2 liters/minute for a 500 gram sample being preferred. A lower flow rate necessitates an increased sparging time. However, this effect is not great, and the sparging gas flow rate is therefore not critical to the invention. In addition, it has been found that the temperature at which the sodium sample is maintained makes very little difference in the obtained results, although a large increase in temperature increases somewhat the diffusion of dissolved fission gases. A temperature varying between 350° and 450° C. was utilized in testing the present invention.

Gamma assay with a germanium-lithium spectrometer was utilized for measuring the $^{135m}$Xe decay activity although the invention is not limited to this technique. The $^{135m}$Xe is removed from the collected sparge gas by absorption on a chromatographic column, followed by counting the 0.527 Mev. gamma rays given off during $^{135m}$Xe decay, 80% of the $^{135m}$Xe decays giving off a gamma ray with a 0.527 Mev. peak. Any method for detecting the $^{135m}$Xe decay activity, however, can be utilized with the present invention.

The typical background level of $^{135}$I in a liquid-sodium breeder reactor at equilibrium has been found to be 72 disintegrations per second (dis./sec.) per gram of sodium. If the present invention is utilized by isolationg a 500 gram sodium sample from such a reactor, sparging the sample with helium for 1 minute at a rate of 1 litre/minute and discarding the gas therefrom, continuing the sparge for 2 additional minutes while collecting the gas from this continued sparge, and assaying the collected gas for $^{135m}$Xe activity, a recorded count of about 400 utilizing the above-described gamma assay technique is obtained for the $^{135m}$Xe decay. The actual number of $^{135m}$Xe decays is about 50,000, but only 400 are recorded due to the 0.01 efficiency-geometry factor and the 80% factor for gamma rays of 0.527 Mev. as previously described. Utilizing Equation 1, the $^{135}$I level is 36,000 dis./sec. for the 500 gram sample which is 72 dis./sec. per gram of sodium. This is a specific activity of $1.9 \times 10^{-3} \mu$ Ci/g.

Very few serious fuel element failures wherein sodium contacts the fuel oxide have been recorded. One such failure, however, occurred at the French reactor, Fortissimo, wherein the $^{135}$I level increased by a factor of about 15 yet the failure was detected only after a considerable fuel failure progression had occurred due to the low sensitivity of the delayed-neutron monitoring technique utilized on the reactor. Substituting the present invention for this monitoring technique by isolating a 500 gram sodium sample, sparging the sample with helium gas at 1 liter/minute for 1 minute and discarding the gas therefrom, continuing the helium sparge for an additional 2 minutes and collecting the gas from this continued sparge, and assaying the collected gas for $^{135m}$Xe activity, a recorded count for $^{135m}$Xe decay of about 6,270 would be obtained. This is equivalent, utilizing Equation 1, to an $^{135}$I level of about 560,000 dis./sec. for the 500 gram sodium sample or 1120 dis./sec. per gram of sodium. This is a signal-to-background ratio of about 15 which would have indicated the serious fuel element failure and allowed monitoring of the failure to determine its progression to prevent fuel particle washout. This invention, however, would have allowed detection of the failure within about 3 minutes from the initial sodium-fuel oxide contact and thereby would have prevented the significant contamination of the coolant which occurred due to the failure.

It will be understood that the invention is not to be limited to the details given herein but that it may be modified within the scope of the appended claims.

The embodiments of the invention in which an exclusive property or privilege is claimed are defined as follows:

1. A method for detecting a fuel element failure in a liquid-sodium-cooled fast breeder reactor and for monitoring the progression thereof, said failure causing sodium coolant to contact the fuel oxide, comprising isolating a sample of liquid sodium coolant; sparging said sample with a gas inert to sodium for a period of time sufficient to remove any gaseous fission products dissolved therein, discarding the resultant gas from said sparge; continuing said gas sparge for an additional measured period of time, collecting the resultant gas from said continuing sparge; and assaying the collected resultant gas for $^{135m}$Xe decay activity, the $^{135m}$Xe having been formed during the additional measured time period from the decay of $^{135}$I dissolved in the sodium sample as a result of sodium-fuel oxide contact, whereby the $^{135m}$Xe decay activity is indicative of the $^{135}$I level in the sodium coolant, said $^{135}$I level indicating the presence and severity or absence of such a fuel element failure.

2. The method according to claim 1 wherein said sodium sample is initially sparged for a period of at least 1 minute, the resultant gas therefrom being discarded; and wherein said gas sparge is continued for an additional measured period of time of at least 2 minutes, the resultant gas therefrom being collected and assayed.

3. The method according to claim 2 wherein said initial sparging period is about 1 minute and said continued sparging period is from 2 to 3 minutes.

4. The method according to claim 1 wherein said gas inert to sodium is helium or argon.

5. The method according to claim 4 wherein said sample contains 500 grams of sodium and is sparged at the rate of 1 to 2 liters per minute.

6. A method for detecting a fuel element failure in a liquid-sodium-cooled fast breeder reactor and for monitoring the progression thereof, said failure causing sodium coolant to contact the fuel oxide, comprising isolating a sample of approximately 500 grams of liquid sodium coolant; maintaining the temperature of said sample at approximately 350°–450° C.; sparging said sodium sample with helium or argon at a flow rate of about 1 to 2 liters/minute for approximately 1 minute, said sparging gas removing any gaseous fission products dissolved therein; discarding the resultant gas from said sparge; continuing said gas sparge for an additional measured period of time of 2 to 3 minutes; collecting the resultant gas from said continuing sparge; and assaying said collected resultant gas for $^{135m}$Xe decay activity, the $^{135m}$Xe having formed during the additional 2 to 3 minutes time period from the decay of $^{135}$I dissolved in the sodium sample as a result of sodium-fuel oxide contact, whereby the $^{135m}$Xe decay activity is indicative of the $^{135}$I level in the sodium coolant, said $^{135}$I level indicating the presence and severity or absence of such a fuel element failure.

References Cited

UNITED STATES PATENTS 3,393,125 7/1968 Jackson _____ 176—19 R

OTHER REFERENCES

Nuclear Science Abstracts, vol. 16 Jan.–Feb. 1962, p. 477, Abstract No. 3892. The Behavior of Fission Products in Pressurized Water Systems.

REUBEN EPSTEIN, Primary Examiner